United States Patent [19]
Kuriyama et al.

[11] Patent Number: 5,316,876
[45] Date of Patent: May 31, 1994

[54] LITHIUM SECONDARY BATTERY

[75] Inventors: Kazuya Kuriyama; Aya Nishino, both of Takatsuki, Japan

[73] Assignee: Yuasa Battery Co., Ltd., Osaka, Japan

[21] Appl. No.: 913,457

[22] Filed: Jul. 15, 1992

[30] Foreign Application Priority Data

Jul. 18, 1991 [JP] Japan .................................. 3-203383

[51] Int. Cl.[5] ........................................... H07M 10/40
[52] U.S. Cl. ..................................... 429/197; 429/198
[58] Field of Search .................................. 429/197, 198

[56] References Cited

U.S. PATENT DOCUMENTS

| H1076 | 7/1992 | Slane et al. | 429/197 X |
| 4,423,125 | 12/1983 | Basu | 429/218 X |
| 4,957,833 | 9/1990 | Daifuku et al. | 429/197 |
| 5,085,954 | 2/1992 | Kita et al. | 429/198 X |

FOREIGN PATENT DOCUMENTS 59-108276  6/1984  Japan ..................................... 429/198

Primary Examiner—Stephen Kalafut
Attorney, Agent, or Firm—Armstrong, Westerman, Hattori, McLeland & Naughton

[57] ABSTRACT

This invention relates to a lithium secondary battery, in which a nonaqueous solvent is used for an electrolyte and a carbonaceous material is used for a negative active material; and especially relates to the electrolyte. Namely, the electrolyte includes one or more kinds of tertiary amines, and the tertiary amines include one or more substituents having two or more numbers of carbon. Further, the electrolyte includes a cyclic ester and includes a solvent having a reduction potential higher than that of the cyclic ester.

1 Claim, 2 Drawing Sheets

LITHIUM SECONDARY BATTERY

BACKGROUND OF THE INVENTION

1. Field of the Invention

This invention relates to a lithium secondary battery, in which a nonaqueous solvent is used for an electrolyte and a carbonaceous material is used for a negative active material.

2. Description of the Prior Art

Recently, a secondary battery utilizing a metallic lithium as its negative electrode has become the object of public attention, and a great technical advance has been made in putting it into practical use. However, this secondary battery has included such a disadvantage as a short charge/discharge cycle life. This problem is caused by a fact that a lithium is deposited in a dendrite-form at time of charge/discharge operation so that its negative electrode is deteriorated.

Therefore, a secondary battery, in which the above problem is solved by using a powdery or fibrous carbon material having a lithium absorbing property to the metallic lithium as the negative electrode, is proposed in Published Unexamined Patent Application (KOKAI) No. 62-268058, for example.

SUMMARY OF THE INVENTION

In the lithium secondary battery having the above construction wherein the carbon material is as the negative electrode however, a cyclic ester is generally used for its electrolyte. Therefore, it includes such a problem that the cyclic ester is decomposed on a surface of the carbon material at the time of initial charging of the battery so that the charge/discharge efficiency is decreased and an initial capacity and charge/discharge cycle performance are worsened.

The present invention is made in order to solve the above problem.

This invention provides a lithium secondary battery, in which a nonaqueous solvent is used for an electrolyte and a carbonaceous material is used for a negative active material, characterized by that the electrolyte includes one or more kinds of tertiary amines, and the tertiary amines include one or more substituents having two or more numbers of carbon.

Further, this invention provides a lithium secondary battery, in which a nonaqueous solvent is used for an electrolyte and a carbonaceous material is used for a negative active material, characterized by that the electrolyte includes a cyclic ester and it further includes a solvent having a reduction potential higher than that of the cyclic ester.

There are used for the tertiary amines; triethylamine, tri-n-propylamine, tri-n-butylamine, tri-n-pentylamine, tri-n-octylamine, triallylamine, tribenzylamine, triphenylamine, N,N-dimethylcyclohexylamine, N,N-diethylcyclohexylamine, N,N-diisopropylethylamine, N,N-dimethylbenzylamine, N,N-dimethyl-1naphthylamine, N-ethyl-N-phenylbenzylamine , N-methyldiphenylamine, N-phenyldibenzylamine etc.

For the cyclic ester there may be used cyclic carbonic ester such as ethylene carbonate, propylene carbonate, 1,2-butylene carbonate, 2,3-butylene carbonate, vinylene carbonate; β-butyrolactone, γ-butyrolactone, γ-valerolactone etc.

For the solvent having a reduction potential higher than that of the cyclic ester there may be used dimethyl carbonate, diethyl carbonate, acetonitrile, dimethyl sulfoxide etc.

The present invention can provide a secondary battery having high capacity, a excellent cycle performance and a low self-discharged.

EMBODIMENTS

Embodiment 1

Figure 1:
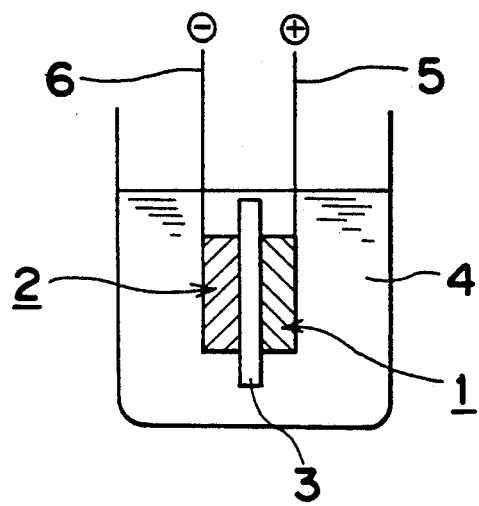
FIG. 1 is a schematic view showing a lithium secondary battery of this invention.

FIG. 1 is the schematic view showing the lithium secondary battery of this invention. In FIG. 1, 1 denotes a positive electrode, 2 denotes a negative electrode, and 3 denotes a separator. The positive electrode 1 is so constructed that a mixed material containing $LiCoO_2$ forming a positive active material, a carbon black forming a conductive agent, and a fluorocarbon polymer forming a binding agent is attached by pressure to a positive current collector 5 comprising an aluminum net. The negative electrode 2 is so constructed that a mixed material containing a carbonaceous powder and a rubber-group binding agent is attached by pressure to a negative current collector 6 comprising a nickel net. The carbon powder is formed by grinding a pitch-group carbon fiber down to an average grain size of 10 microns. The separator 3 is composed of a fine porous film made of polypropylene. The numeral 4 denotes an electrolyte.

In this embodiment, solution in which a $LiBF_4$ is dissolved in γ-butyrolactone and triethylamine is used for the electrolyte 4. This means that the electrolyte 4 of this embodiment includes the tertiary amine.

The battery of this embodiment is named battery X1.

Embodiment 2

A solution in which $LiBF_4$ is dissolved in γ-butyrolactone and tri-N-butylamine is used for the electrolyte 4, and the other conditions are the same as those of the battery X1. This means that the electrolyte 4 of this embodiment includes the tertiary amine. The battery of this embodiment is named battery X2.

COMPARISON EXAMPLE 1

A solution in which $LiBF_4$ is dissolved in γ-butyrolactone is used for the electrolyte 4, and the other conditions are the same as those of the battery X1. This means that the electrolyte 4 of this comparison example 1 does not include the tertiary amine. The battery of this comparison example is named battery Y1.

Initial capacities and charge/discharge efficiencies of the batteries X1, X2 and Y1 were compared by a test method as described below. Results are listed in Table 1. In the test method, charging was carried out under the conditions of constant current and constant voltage, in which the current density of the constant current was $1mA/cm^2$, the final voltage was 4.2V, and the constant voltage charge was executed at 4.2V for 5 hours; and discharging was carried out under a condition of constant current, in which the current density was 1mA/cm$^2$ and the final voltage was 3.0V.

TABLE 1

| | Initial Capacity | Charge/discharge efficiency of first cycle |
|---|---|---|
| Battery X1 | 16 mAh | 98% |
| Battery X2 | 16 mAh | 97% |
| Battery Y1 | 9 mAh | 70% |

It can be seen from Table 1 that the initial capacities and charge/discharge efficiencies of the batteries X1, X2 are by far superior than those of the battery Y1.

The batteries X1, X2 and Y1 were left as they were for 30 days at room temperature under fully charged states, and self-discharges were then measured. Results are listed in Table 2.

TABLE 2

| | Self-discharge rate |
|---|---|
| Battery X1 | 2.5% |
| Battery X2 | 3.0% |
| Battery Y1 | 15.5% |

It can be seen from Table 2 that the self-discharges of the batteries X1 and X2 are smaller than that of the battery Y1.

Figure 2:
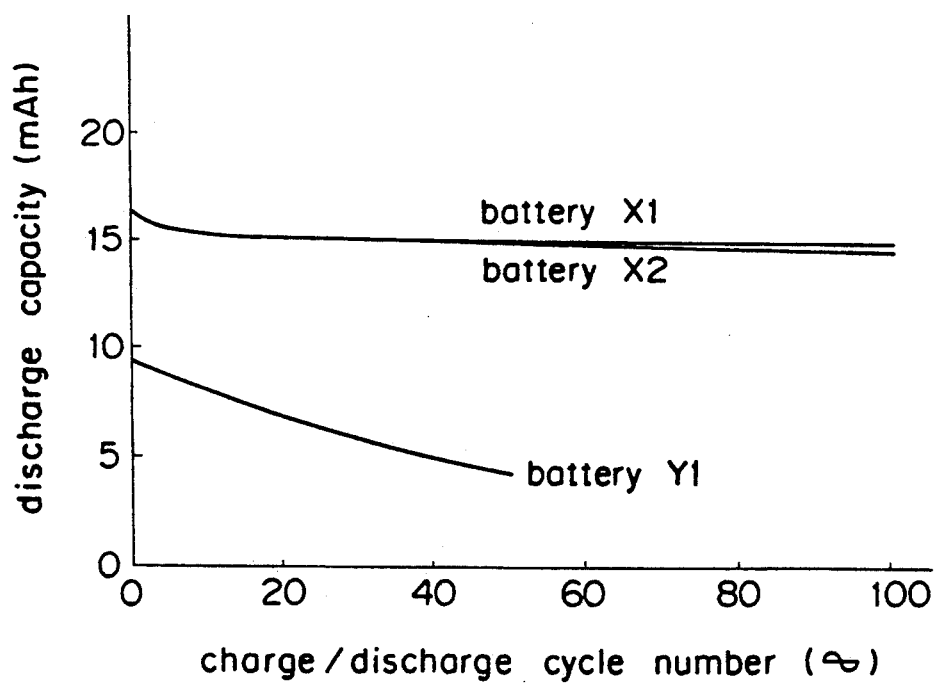
FIG. 2 is a characteristic diagram showing relationships between charge/discharge cycle numbers and discharge capacities for batteries of embodiments 1 and 2 of this invention and comparison example 1.

Further, relationship between charge/discharge cycle numbers and discharge capacities of the batteries X1, X2 and Y1 were investigated. Results are shown in FIG. 2. It can be seen from FIG. 2 that the capacities of the batteries X1 and X2 scarcely decrease even after they have been subjected to 100 cycles, but the capacity of the battery Y1 decreases down to 50% of the initial capacity when it has been subjected to 50 cycles.

As described above, according to embodiments 1 and 2, a lithium secondary battery havinq a high capacity, excellent cycle performance and small self-discharge can be provided. This lithium secondary battery has an extremely large industrial value.

Embodiment 3

A solution in which LiBF$_4$ is dissolved in γ-butyrolactone, propylene carbonate and dimethyl carbonate is used for the electrolyte 4, and the other conditions are the same as those of the battery X1. This means that the electrolyte 4 of this embodiment includes a cyclic ester and a solvent having a higher reduction potential than that of the cyclic ester. Here, a cyclic carbonic ester is also used for the cyclic ester. The battery of this embodiment is named battery X3.

Embodiment 4

A solution in which LiBF$_4$ is dissolved in γ-butyrolactone and dimethyl carbonate is used for the electrolyte 4, and the other conditions are the same as those of the battery X1. This means that the electrolyte 4 of this embodiment includes a cyclic ester and a solvent having a higher reduction potential than that of the cyclic ester. The battery of this embodiment is named battery X4.

Embodiment 5

A solution in which LiBF$_4$ is dissolved in propylene carbonate and dimethyl carbonate is used for the electrolyte 4, and the other conditions are the same as those of the battery X1. This means that the electrolyte 4 of this embodiment includes a cyclic ester and a solvent having a higher reduction potential than that of the cyclic ester. Here, only a cyclic carbonic ester is used for the cyclic ester. The battery of this embodiment is named battery X5.

COMPARISON EXAMPLE 2

A solution in which a LiBF$_4$ is dissolved in γ-butyrolactone and propylene carbonate is used for the electrolyte 4, and the other conditions are the same as those of the battery X1. This means that the electrolyte 4 of this comparison example does not include a solvent having a higher reduction potential than that of a cyclic ester. Here, a cyclic carbonic ester is also used for the cyclic ester. The battery of this comparison example is named battery Y2.

COMPARISON EXAMPLE 3

A solution in which LiBF$_4$ is dissolved in γ-butyrolactone is used for the electrolyte 4, and the other conditions are the same as those of the battery X1. This means that the electrolyte 4 of this comparison example does not include a solvent having a higher reduction potential than that of a cyclic ester. The battery of this comparison example is named battery Y3.

COMPARISON EXAMPLE 4

A solution in which LiBF$_4$ is dissolved in propylene carbonate is used for the electrolyte 4, and the other conditions are the same as those of the battery X1. This means that the electrolyte 4 of this comparison example does not include a solvent having a higher reduction potential than that of a cyclic ester. Here, only a cyclic carbonic ester is used for the cyclic ester. The battery of this comparison example is named battery Y4.

Initial capacities and charge/discharge efficiencies of the batteries X3, X4, X5, Y2, Y3 and Y4 were compared by a test method as described below. Results are listed in Table 3. In the test method, charging was carried out under conditions of constant current and constant voltage, in which the current density of the constant current was 1mA/cm$^2$, the final voltage was 4.2V, and the constant voltage charge was executed at 4.2V for 5 hours; and discharging was carried out under a condition of constant current, in which the current density of was 1mA/cm$^2$ and the final voltage was 3.0V.

TABLE 3

| | Initial Capacity | Charge/discharge efficiency of first cycle |
|---|---|---|
| Battery X3 | 16 mAh | 98% |
| Battery X4 | 16 mAh | 98% |
| Battery X5 | 15 mAh | 97% |
| Battery Y2 | 9 mAh | 70% |
| Battery Y3 | 8 mAh | 64% |
| Battery Y4 | 8 mAh | 62% |

It can be seen from Table 3 that the initial capacities and charge/discharge efficiencies of the batteries X3, X4 and X5 are by far more excellent than those of the batteries Y2, Y3 and Y4.

The batteries X3, X4, X5, Y2, Y3 and Y4 were left as they were for 30 days at room temperature under fully charges states, and self-discharges were then measured. Results are listed in Table 4.

TABLE 4

| | Self-discharge rate |
|---|---|
| Battery X3 | 2.5% |

TABLE 4-continued

| | Self-discharge rate |
|---|---|
| Battery X4 | 3.0% |
| Battery X5 | 3.0% |
| Battery Y2 | 15.5% |
| Battery Y3 | 17.0% |
| Battery Y4 | 17.5% |

It can be seen from Table 4 that the self-discharges of the batteries X3, X4 and X5 are smaller than those of the batteries Y2, Y3 and Y4.

Figure 3:
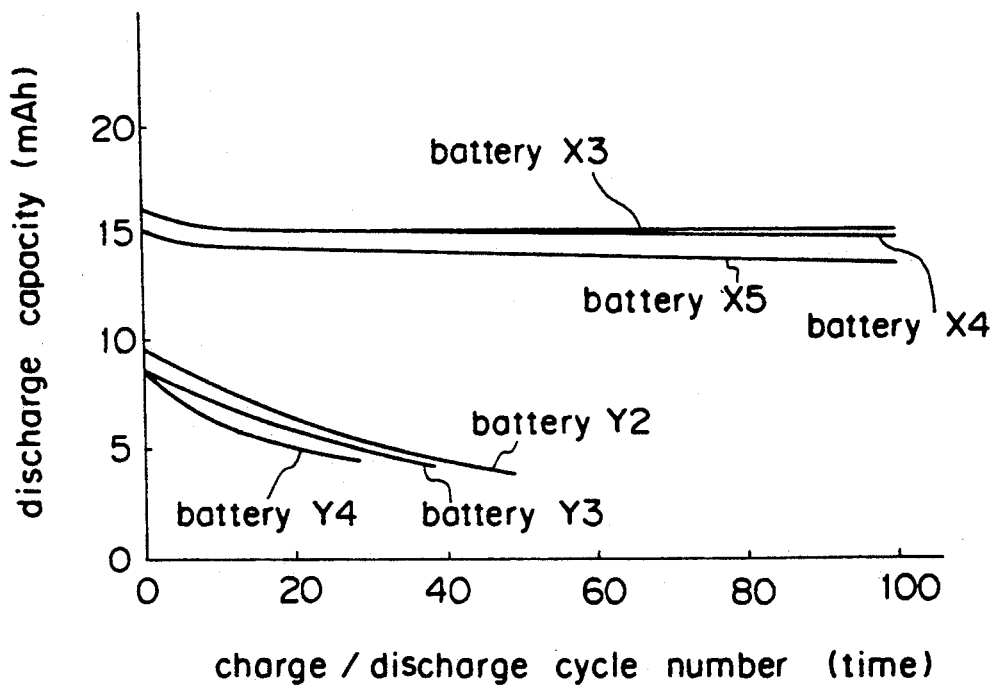
FIG. 3 is a characteristic diagram showing relationships between charge/discharge cycle numbers and discharge capacities for batteries of embodiments 3 through 5 of this invention and comparison examples 2 through 4.

Further, relationships between charge/discharge cycle numbers and discharge capacities of the batteries X3, X4, X5, Y2, Y3 and Y4 were investigated. Results are shown in FIG. 3. It can be seen from FIG. 3 that the capacities of the batteries X3, X4 and X5 scarcely decrease even after they have been subjected to 100 cycles, but the capacities of the batteries Y2, Y3 and Y4 decrease down to 50% of the initial capacities when they have been subjected to 50 cycles.

As described above, according to the embodiments 3 through 5, a lithium secondary battery having a high capacity, excellent cycle performance and small self-discharge can be provided. This lithium secondary battery has an extremely large industrial value.

What is claimed is:

1. A lithium secondary battery, in which a nonaqueous solvent is used for an electrolyte and a carbonaceous material is used for a negative electrode; the electrolyte including one or more kinds of tertiary amines, and the tertiary amines include one or more substituents having a two or more carbon atoms.

* * * * *

UNITED STATES PATENT AND TRADEMARK OFFICE
CERTIFICATE OF CORRECTION

PATENT NO. : 5,316,876
DATED : May 31, 1994
INVENTOR(S) : KURIYAMA et al

It is certified that error appears in the above-indentified patent and that said Letters Patent is hereby corrected as shown below:

On the cover page, Item [73], correct the assignee's name "Yuasa Battery Co., Ltd." to --Yuasa Corporation--.

Signed and Sealed this

Twenty-fifth Day of April, 1995

Attest:

BRUCE LEHMAN

*Attesting Officer*    *Commissioner of Patents and Trademarks*